(12) United States Patent
Peng et al.

(10) Patent No.: US 9,400,634 B2
(45) Date of Patent: Jul. 26, 2016

(54) SYSTEMS AND METHODS FOR COMMUNICATING NOTIFICATIONS AND TEXTUAL DATA ASSOCIATED WITH APPLICATIONS

(71) Applicant: Google Technology Holdings LLC, Mountain View, CA (US)

(72) Inventors: Long Peng, Buffalo Grove, IL (US); Hui Dai, Northbrook, IL (US); Xin Guan, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 323 days.

(21) Appl. No.: 14/096,685

(22) Filed: Dec. 4, 2013

(65) Prior Publication Data

US 2015/0121227 A1 Apr. 30, 2015

Related U.S. Application Data

(60) Provisional application No. 61/896,368, filed on Oct. 28, 2013.

(51) Int. Cl.
*G06F 3/16* (2006.01)
*G10L 13/02* (2013.01)

(52) U.S. Cl.
CPC ............... *G06F 3/167* (2013.01); *G10L 13/02* (2013.01)

(58) Field of Classification Search
CPC .................................. G06F 3/048; G06F 3/167
See application file for complete search history.

(56) References Cited

U.S. PATENT DOCUMENTS

| | | | |
|---|---|---|---|
| 6,393,296 B1 | 5/2002 | Sabnani et al. | |
| 7,542,773 B2 | 6/2009 | Koch | |
| 7,844,215 B2 | 11/2010 | Vance et al. | |
| 7,853,655 B2 | 12/2010 | Nussey | |
| 7,904,516 B2 | 3/2011 | Chern | |
| 7,912,912 B2 | 3/2011 | Yuyama | |
| 7,966,184 B2 | 6/2011 | O'Conor et al. | |
| 8,024,340 B2 | 9/2011 | Kageyama et al. | |

(Continued)

FOREIGN PATENT DOCUMENTS

| | | |
|---|---|---|
| EP | 1213659 A2 | 6/2002 |
| EP | 1298941 B1 | 7/2008 |

OTHER PUBLICATIONS

AT&T Intellectual Property, "AT&T VoiceMail User Guide", https://www.vm.att.com/dchelp/EN/att_vm_user_guide.pdf, version 9.1, 2008, 40 pages.

(Continued)

*Primary Examiner* — Anil Bhargava
(74) *Attorney, Agent, or Firm* — Fish & Richardson P.C.

(57) ABSTRACT

Embodiments are provided for communicating notifications and other textual data associated with applications installed on an electronic device. According to certain aspects, a user can interface with an input device to send (218) a wake up trigger to the electronic device. The electronic device retrieves (222) application notifications and converts (288) the application notifications to audio data. The electronic device also sends (230) the audio data to an audio output device for annunciation (232). The user may also use the input device to send (242) a request to the electronic device to activate the display screen. The electronic device identifies (248) an application corresponding to an annunciated notification, and activates (254) the display screen and initiates the application.

20 Claims, 10 Drawing Sheets

(56) References Cited

U.S. PATENT DOCUMENTS

| | | |
|---|---|---|
| 8,135,392 B2 | 3/2012 | Marcellino et al. |
| 8,316,046 B2 | 11/2012 | Huang et al. |
| 9,146,617 B2* | 9/2015 | Fleizach ................. G06F 3/017 |
| 2005/0058268 A1* | 3/2005 | Koch ................. H04W 68/005 379/207.16 |
| 2005/0169285 A1 | 8/2005 | Wills et al. |
| 2007/0282973 A1 | 12/2007 | Chapman et al. |
| 2008/0146197 A1 | 6/2008 | Lim |
| 2009/0083658 A1* | 3/2009 | Ito ..................... H04M 1/72552 715/781 |
| 2002/0227294 | 9/2009 | Ouchi et al. |
| 2009/0274042 A1 | 11/2009 | Asati et al. |
| 2011/0319141 A1 | 12/2011 | Miwa |
| 2012/0319849 A1 | 12/2012 | Cavanaugh |
| 2013/0027429 A1* | 1/2013 | Hogg ................. G06F 17/3087 345/633 |
| 2013/0040662 A1* | 2/2013 | Elisco ................. H04W 52/027 455/456.3 |
| 2013/0085761 A1* | 4/2013 | Bringert ................. G06F 3/167 704/275 |
| 2013/0191791 A1* | 7/2013 | Rydenhag ........... G06F 3/04883 715/863 |
| 2014/0120988 A1* | 5/2014 | Gunn ..................... G06F 3/0488 455/566 |
| 2015/0042571 A1* | 2/2015 | Lombardi ................. G06F 3/01 345/173 |
| 2015/0098628 A1* | 4/2015 | Macciola ................. H04N 1/387 382/112 |

OTHER PUBLICATIONS

Qurl, "Dynamic Widgets" plugin description for WordPress.org, http://wordpress.org/plugins/dynamic-widgets/, Dec. 15, 2012, 3 pages.

* cited by examiner

SYSTEMS AND METHODS FOR COMMUNICATING NOTIFICATIONS AND TEXTUAL DATA ASSOCIATED WITH APPLICATIONS

FIELD

This application generally relates to improving the user experience during interaction with electronic devices. In particular, the application relates to platforms and techniques for communicating notifications and other textual data associated with applications installed on an electronic device.

BACKGROUND

As electronic devices such as smart phones continue to evolve and offer more diverse functionalities, users continue to increase the amount of time they interact with these electronic devices. For example, current smart phones and tablet computing devices offer movie viewing and music playback, email support, social networking applications, and various productivity features that collectively make the electronic devices a singular hub for a variety of entertainment and productivity uses. Some applications of existing electronic devices support notifications that generally provide a condensed summary of various features, updates, or communications associated with the applications. For example, a social networking application may support notifications associated with new "friend requests," a new message or interaction, an available update, and others.

However, current electronic devices offer few options for communicating or otherwise indicating application notifications. For example, some electronic devices display notifications on a "home screen" or similar interface. Further, some electronic devices merely indicate available notifications via an icon or graphic. Accordingly, a user of the electronic device must physically interact with the electronic device to access or view the notifications, and then must then perform various additional steps to initiate a corresponding application, if desired. Additionally, displaying the notifications causes the electronic devices to quickly lose battery life, because the display screen is often the component that requires the most battery power. Moreover, current notification communication techniques do not account for the increasing prevalence of peripheral devices and components configured to interface with electronic devices, such as smart watches, wireless external speakers, and the like.

Accordingly, there is an opportunity to implement embodiments for effectively and efficiently communicating notifications and other textual data associated with applications installed on an electronic device while reducing the required user interaction for both consuming the notifications and initiating any corresponding applications. Additionally, there is an opportunity to implement embodiments for leveraging peripheral devices and components to facilitate the communication of notifications and textual data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 2 (FIGS. 2A and 2B) depicts an example signal diagram associated with communicating notifications and requesting application initiation, in accordance with some embodiments.

FIG. 4 (FIGS. 4A and 4B) depicts an example signal diagram associated with initiating the communication of notifications and other textual data associated with applications, in accordance with some embodiments.

FIG. 6 (FIGS. 6A and 6B) depicts a flow diagram of initiating communication of notifications and other textual data associated with applications, as well as requesting application initiation, in accordance with some embodiments.

DETAILED DESCRIPTION

Embodiments as detailed herein enable effective and efficient communication of application notifications and other textual data. An electronic device supports a set of applications that individually have notification capabilities. For example, a weather application may support notifications for severe weather, and a map application may support notifications for turn-by-turn directions, estimated time of arrival, and others. The electronic device is configured to generate speech synthesized audio data that corresponds to the notifications and textual data. The embodiments may also include an audio output device such as an external speaker as well as an input device such as a peripheral hardware component that includes input selectors. According to aspects, the audio output device and the input device may be included as part of the electronic device or may be separate from and connectable to the electronic device via various communication channels.

The input device enables a user to initiate the generation and annunciation or playback of the audio data. In particular, the electronic device may receive a request from the input device to generate the audio data corresponding to one or more notifications and textual data and send the generated audio data to the audio output device for audible annunciation. The user may further use the input device to control the playback of the generated audio data, such as if the user wishes to skip one or more notifications. In some cases, the user may wish for the electronic device to initiate a particular application based on one of the annunciated notifications. For example, if the user hears the subject line of an unread email, the user can cause the input device to send a request to the electronic device to cease outputting the notifications, activate the display screen, and initiate an email application that navigates to the unread email.

The embodiments as discussed herein offer benefits to users by annunciating application notifications for the user without the user having to physically view the electronic device. Accordingly, the embodiments enable the user to perform other tasks while the audio output device annunciates the notifications. Further, by leveraging the audio output device to annunciate the notifications, the electronic device need not turn on its display screen and will therefore conserve battery life. Moreover, the embodiments enable users to leverage peripheral devices such as smart watches to consume the notifications, such as in cases in which the electronic device is not easily accessible. It should be appreciated that additional benefits and improvements may be realized by the embodiments.

Although some portions of this Detailed Description describe generating audio data corresponding to one of application notifications or textual data, it should be appreciated that the various embodiments as described herein support generating audio data corresponding to either or both of the application notifications and the textual data.

Figure 1:
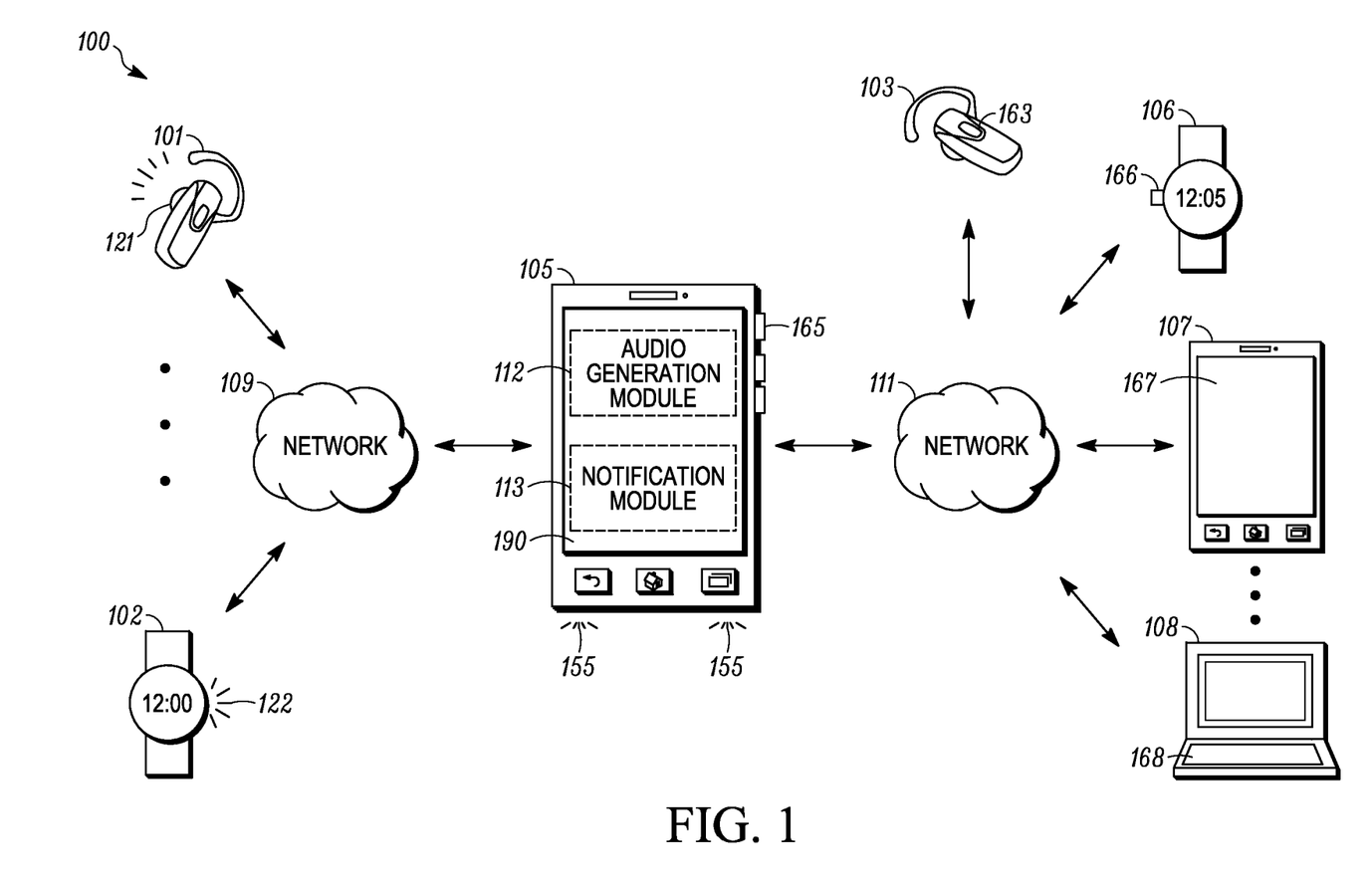
FIG. 1 depicts an example representation of electronic devices capable of facilitating the communication of notifications and other textual data, in accordance with some embodiments.

FIG. 1 is an example representation 100 of an electronic device and other components configured to facilitate the notification management techniques as discussed herein. As illustrated in FIG. 1, the representation 100 includes an electronic device 105 that may be any type of standalone or portable electronic device, for example, a desktop or notebook computer, a mobile phone, a Personal Digital Assistant (PDA), a smart phone, a tablet computer, a multimedia player, an MP3 player, a digital broadcast receiver, a remote controller, or any other electronic apparatus. The electronic device 105 is configured to execute one or more applications installed thereon and facilitate user interaction with the applications via a user interface including a display screen 190. The electronic device 105 includes a notification module 113 that is configured to interface with the installed application(s) and identify any notifications or textual data associated with the application(s). For example, a notification for an email application can indicate an unread email of the number of unread messages. For further example, textual data associated with an email application can include the body of the email itself and its sender. The electronic device 105 further includes an audio generation module 112 that is configured to generate speech synthesized audio data (or "text-to-speech" audio data) that corresponds to the identified notification(s) or textual data. Continuing with the example, the speech synthesized audio data can include audio that recites that there is an unread email and/or that recites the sender and then the body of the unread email.

The electronic device 105 can be configured to connect to one or more audio output devices 101, 102 via a network 109. According to embodiments, the electronic device 105 is configured to transmit or send the speech synthesized audio data to one or more of the audio output devices 101, 102 for audible annunciation via an audio output component 121, 122 (e.g., a speaker) of the respective audio output devices 101, 102. Each audio output device 101, 102 may be a Bluetooth® headset, a watch, a desktop or notebook computer, a mobile phone, a PDA, a smart phone, a tablet computer, a multimedia player, an MP3 player, a digital broadcast receiver, a remote controller, or any other electronic apparatus that includes an audio output component. Although FIG. 1 illustrates two (2) audio output devices 101, 102, it should be appreciated that other amounts and types of audio output devices are envisioned.

The electronic device 105 can also be configured to connect to one or more input devices 103, 106, 107, 108 via a network 111. Each of the input devices 106, 107, 108 is configured to send commands to the electronic device 105 to initiate the notification identification and audio data generation, as well as send commands to control some of the display-based functions of the electronic device 105. For example, a command can instruct the electronic device 105 to turn off or otherwise obscure its display screen. Further, each of the input devices 106, 107, 108, via the electronic device 105, is configured to control the playback/annunciation (e.g., rewind, fast-forward, skip, etc.) of the speech synthesized audio data on the corresponding audio output device 101, 102. Each of the input devices 103, 106, 107, 108 can include an input selector 163, 166, 167, 168 or other type of actuator component, button, rocker, touch screen, touch pad, camera, infrared sensor, or other component or input configured for selection by a user that causes the corresponding input device 106, 107, 108 to send the commands to the electronic device 105. Each of the input devices 106, 107, 108 may be a Bluetooth® headset, a watch, a desktop or notebook computer, a mobile phone, a PDA, a smart phone, a tablet computer, a multimedia player, an MP3 player, a digital broadcast receiver, a remote controller, or any other electronic apparatus. Although FIG. 1 illustrates three (3) input devices 106, 107, 108, it should be appreciated that other amounts and types of input devices are envisioned.

Although not illustrated in FIG. 1, it should be appreciated that an audio output device and an input device may be combined into a single device. For example, a smart watch 102, 106 may include both an external speaker configured to annunciate audio, as well as an input selector configured for actuation by a user to initiate sending a command to the electronic device 105. Further, although not illustrated in FIG. 1, it should be appreciated that an audio output device and an input device may be combined into the electronic device 105. For example, a smart phone may have a set of applications installed therein, as well as an external speaker 155 for annunciating audio and an input selector 165 (e.g., a power button or a "volume up" button) for actuation by a user to initiate audio generation and/or control audio playback.

The networks 109, 111 as described herein can each be a wired or wireless local area network (LAN/WLAN) or personal area network (PAN/WPAN). It should be appreciated that each of the networks 109, 111 may facilitate any type of data communication via various standards or technologies (e g, infrared, ZigBee, near field communication (NFC), Z-Wave, Wireless USB, IEEE 802 including Ethernet, WiMAX, WiFi, Bluetooth®, and others).

Figures 2, 2A:
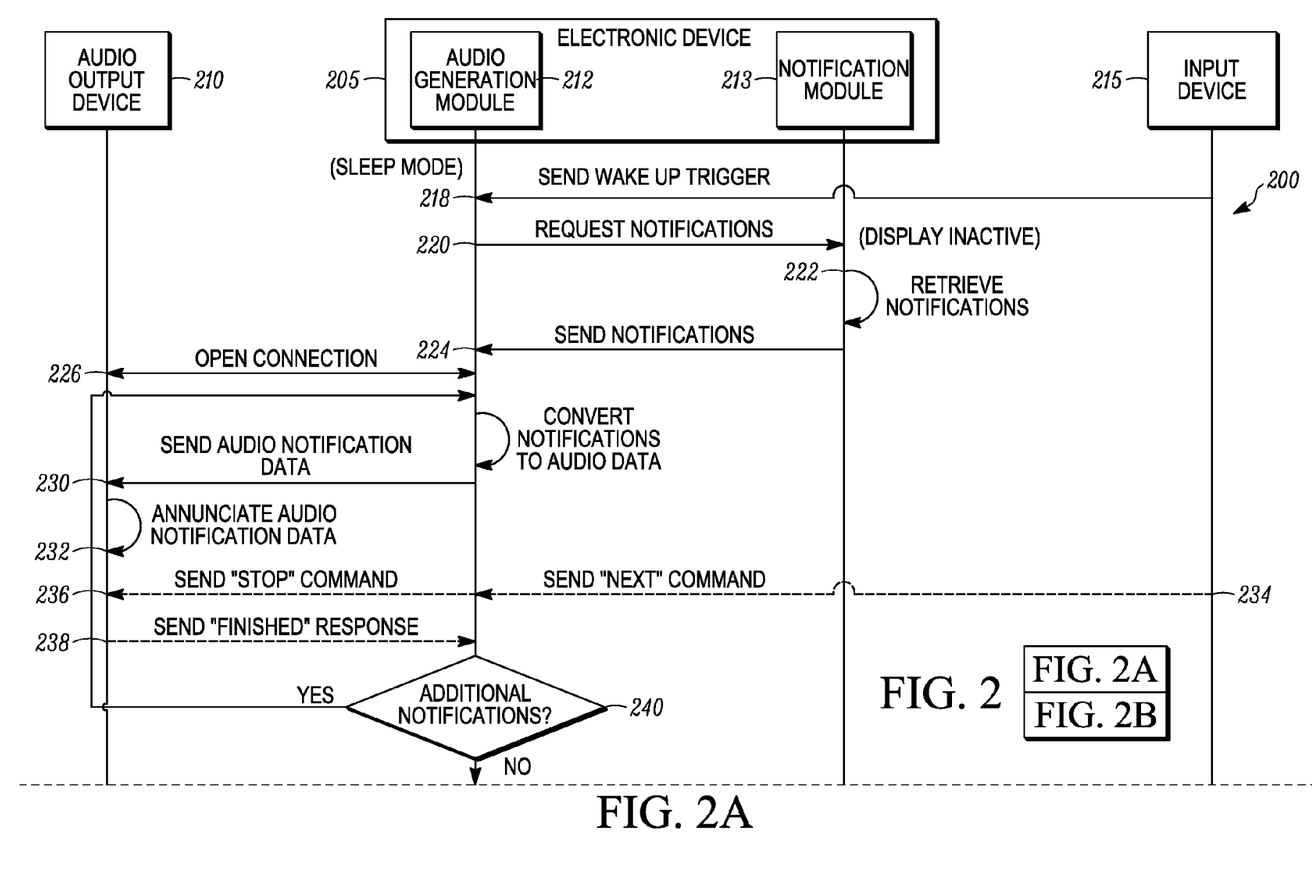
Figure 2B:
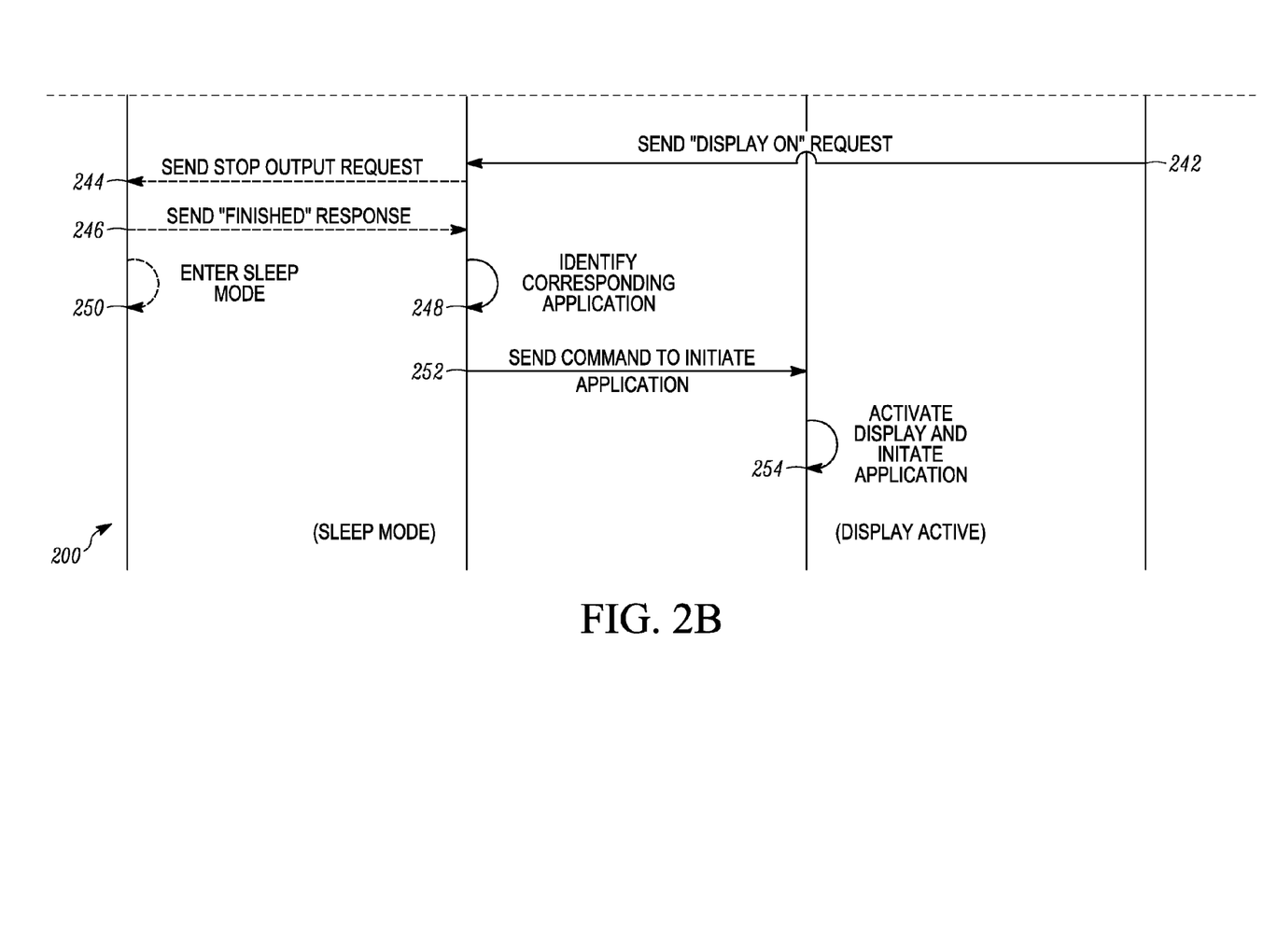

FIG. 2 (FIGS. 2A and 2B) depicts an example signaling diagram 200 associated with managing application notifications and textual data using an electronic device 205 and audio generation module 212 and notification module 213 thereof (such as the electronic device 105 and audio generation module 112 and notification module 113 discussed with respect to FIG. 1), an audio output device 210 (such as the audio output device 101 as discussed with respect to FIG. 1), and an input device 215 (such as the input device 108 as discussed with respect to FIG. 1). In some embodiments, the input device 215 and the audio output device 210 may be combined into a single device. In other embodiments, the input device 215 and the audio output device 210 may be combined into the electronic device 205.

The functionalities can begin with the input device 215 sending (218) a "wake up" trigger to the audio generation module 212. The wake up trigger can be initiated by a user of the input device 215 via a selection of an input selector (e.g., a key, hardware button, software button, or other selectors). In some cases, the wake up trigger may be an audio command. Although not illustrated in FIG. 2, the audio generation module 212 may process the wake up trigger differently based on the type of trigger, which will be discussed later with respect to FIG. 6.

Responsive to receiving the wake up trigger, the audio generation module 212 can request (220) the notification module 213 for one or more notifications (or other textual data) associated with one or more applications executing on or otherwise installed on the electronic device 205. In embodiments, the audio generation module 212 may communicate with the notification module 213 using an application programming interface (API) of an operating system of the electronic device 205. The notification module 213 can retrieve (222) any notifications associated with the application(s). In some cases, the notification module 213 can be a component of an operating system of the electronic device 205 whereby the notification module 213 communicates with the applications at the operating system level and requests the notifications. In some embodiments, the audio generation module 212 may retrieve the notifications via directly communicating with the applications.

The notification module 213 can send or provide (224) the notifications to the audio generation module 212. The audio generation module 212 can open (226) a connection with (or can "discover") the audio output device 210, for example via a PAN, WPAN, LAN, WLAN, or other type of connection. In some cases, the audio generation module 212 can open the connection in response to receiving the wake up trigger at 218. The audio generation module 212 can also convert (228) one or more of the notifications received from the notification module 213 to audio data. In particular, the audio generation module 212 may generate speech synthesized audio data (text-to-speech data) based on the notifications or portions thereof. The audio generation module 212 can send (230) the audio notification data to the audio output device 210 and the audio output device 210 can audibly annunciate (232) the audio notification data, for example via an external speaker or other audio output component. According to embodiments, a display screen of the electronic device 205 may be powered off or otherwise obscured after sending the audio notification data.

According to embodiments, the input device 215 may also facilitate the playback/annunciation of the audio notification data on the audio output device 210. For example, the input device 215 can send (234) a "next" command to the audio generation module 212, such as if a user of the input device 215 selects a designated input selector (e.g., a "volume up" button). The next command can instruct the audio generation module 212 to send a subsequent audio notification to the audio output device 210. In response to receiving the next command, the audio generation module 212 can send (236) a "stop" command to the audio output device 210 that instructs the audio output device 210 to stop annunciating audio data corresponding to the current notification. The audio output device 210 can send (238) a "finished" response to the audio generation module 212 that indicates that the audio output device 210 stopped annunciating the current notification. Although not illustrated in FIG. 2, it should be appreciated that the input device 215, audio generation module 212, and audio output device 210 may support other playback commands such as, for example, pause, rewind, fast-forward, replay, stop, and others.

Although not depicted in FIG. 2, it should be appreciated that the devices (210, 205, 215) may dynamically change roles. For example, a Bluetooth® headset (i.e., audio output device 210) may annunciate certain audio notification data sent from a smart phone (i.e., electronic device 205), and then a user may select (e.g., via an input selector) to have the smart phone annunciate additional audio notification data, thus enabling the smart phone to have the audio output device role. Similarly, if the smart phone speaker is annunciating audio notification data, the user may use the Bluetooth® headset to request that the Bluetooth® headset be the audio output device. Further, in embodiments, one or more additional input devices may connect to the electronic device 205 and send various triggers and playback commands to the electronic device 205. For example, a user may use both a smart watch and an external headset as input devices for audio notification playback. The electronic device 205 can queue the received commands according to time of receipt and then process the commands sequentially.

The audio generation module 212 can also determine (240) if there are additional notifications that need to be annunciated as audio data. If there are additional notifications ("YES"), processing can return to 228 at which the audio generation module 212 can convert an additional notification to audio data and then facilitate the audio notification annunciating via the audio output device 210. If there are not additional notifications ("NO"), processing can proceed to 242 at which the audio generation module 212 may receive (242) a "display on" request from the input device 215. According to embodiments, a user of the input device 215 may trigger the display on request if the user wishes to have the electronic device 205 initiate an application. In particular, the application may correspond to the currently-annunciating or most recently-annunciated audio notification. For example, if the audio output device 210 annunciates a notification that indicates a new text message, the user can cause the electronic device 205 to initiate a corresponding text messaging application via the display on request from the input device 215. In some embodiments, the audio generation module may receive 242 the "display on" request before determining if there are additional notifications at 240.

In an optional embodiment, the audio generation module 212 can send (244) a stop output request to the audio output device 210, and the audio output device 210 can cease from annunciating any audio notification data. The audio output device 210 can optionally send (246) a finished response to the audio generation module 212 indicating that the audio output device 210 has stopped annunciating audio notification data. Further, the audio output device 210 can optionally enter (250) into a sleep mode.

Responsive to receiving the display on request, the audio generation module 212 can identify (248) an application that corresponds to the currently-annunciating or most recently-annunciated audio notification. For example, if the audio generation module 212 sends audio data to the audio output device 210 corresponding to a new friend request notification for a social networking application and then receives a display on request from the input device 215, the audio generation module 212 may identify the social networking application as the application to initiate. Further, the audio generation module 212 can send (252) a command to the notification module 213 to initiate the application. Responsive to receiving the command, the notification module 213 can activate (254) a display screen of the electronic device 205 and initiate the application.

Figure 3:
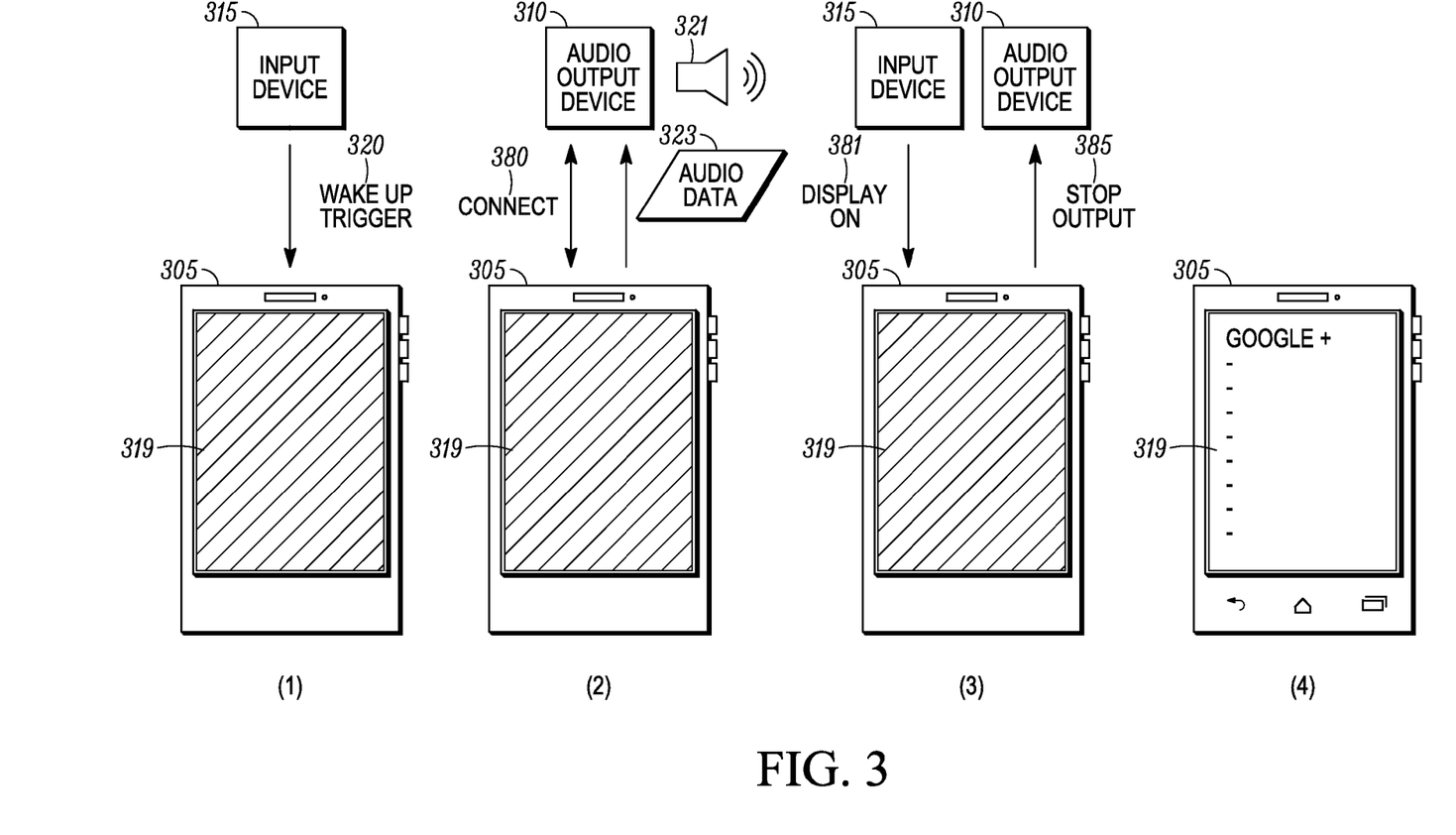
FIG. 3 depicts an example representation of devices configured to communicate notifications and request application initiation, in accordance with some embodiments.

FIG. 3 depicts an example representation 300 of functionalities and communications associated with managing application notification and textual data annunciation using an electronic device 305, an audio output device 310, and an input device 315.

The first illustration (1) of FIG. 3 depicts the electronic device 305 with a display screen 319 powered off. The input device 315 sends the wake up trigger 320 to the electronic device 305. The second illustration (2) of FIG. 3 depicts the electronic device 305 responding to the wake up trigger 320. In particular, the electronic device 305 connects 380 to the audio output device 310 and sends audio data 323 to the audio output device 310. In particular, the audio data is speech synthesized audio data corresponding to notifications and/or other types of textual data associated with one or more applications installed on the electronic device 205. Further, the audio output device 310 audibly annunciates the audio data 323 via a component such as a speaker 321. The display screen 319 of the electronic device 305 remains powered off or otherwise obscured during the audio data annunciation.

The third illustration (3) of FIG. 3 depicts the input device 315 sending a "display on" request 381 to the electronic device 305. Responsive to receiving the request 381, the electronic device 305 sends a stop output request 385 to the audio output device 310, after which the audio output device 310 can cease annunciating the audio data and optionally send a finished response to the electronic device 305. The electronic device 305 can identify the application corresponding to the currently-annunciating or most recently-annunciated notification (or textual data). For example, as shown in the fourth illustration (4) of FIG. 3, the most recently-annunciated notification may correspond to the Google+™ application. Accordingly, the electronic device 305 can power on or activate the display screen 319 and initiate the Google+™ application for interaction with the user.

Figures 4, 4A:
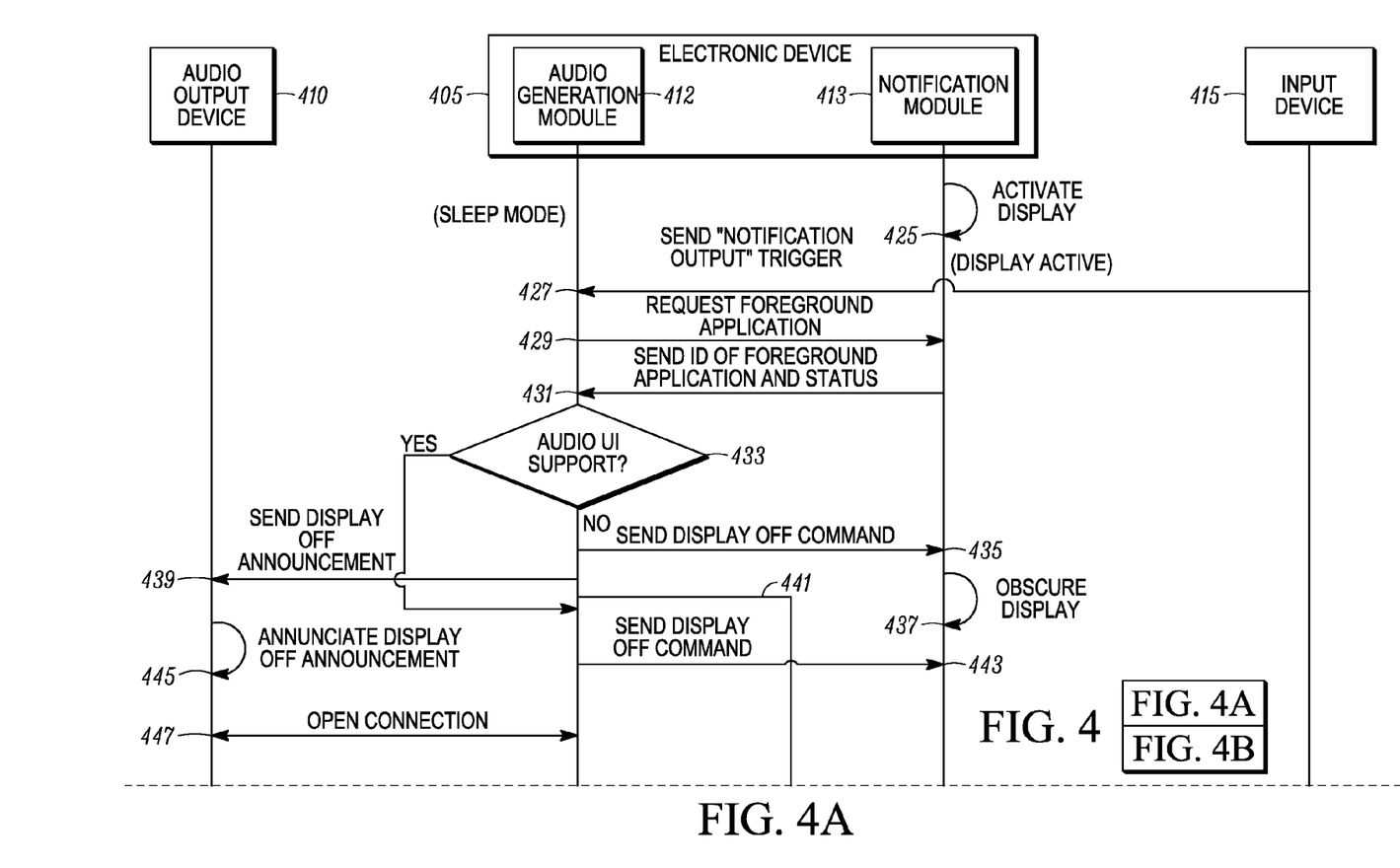
Figure 4B:
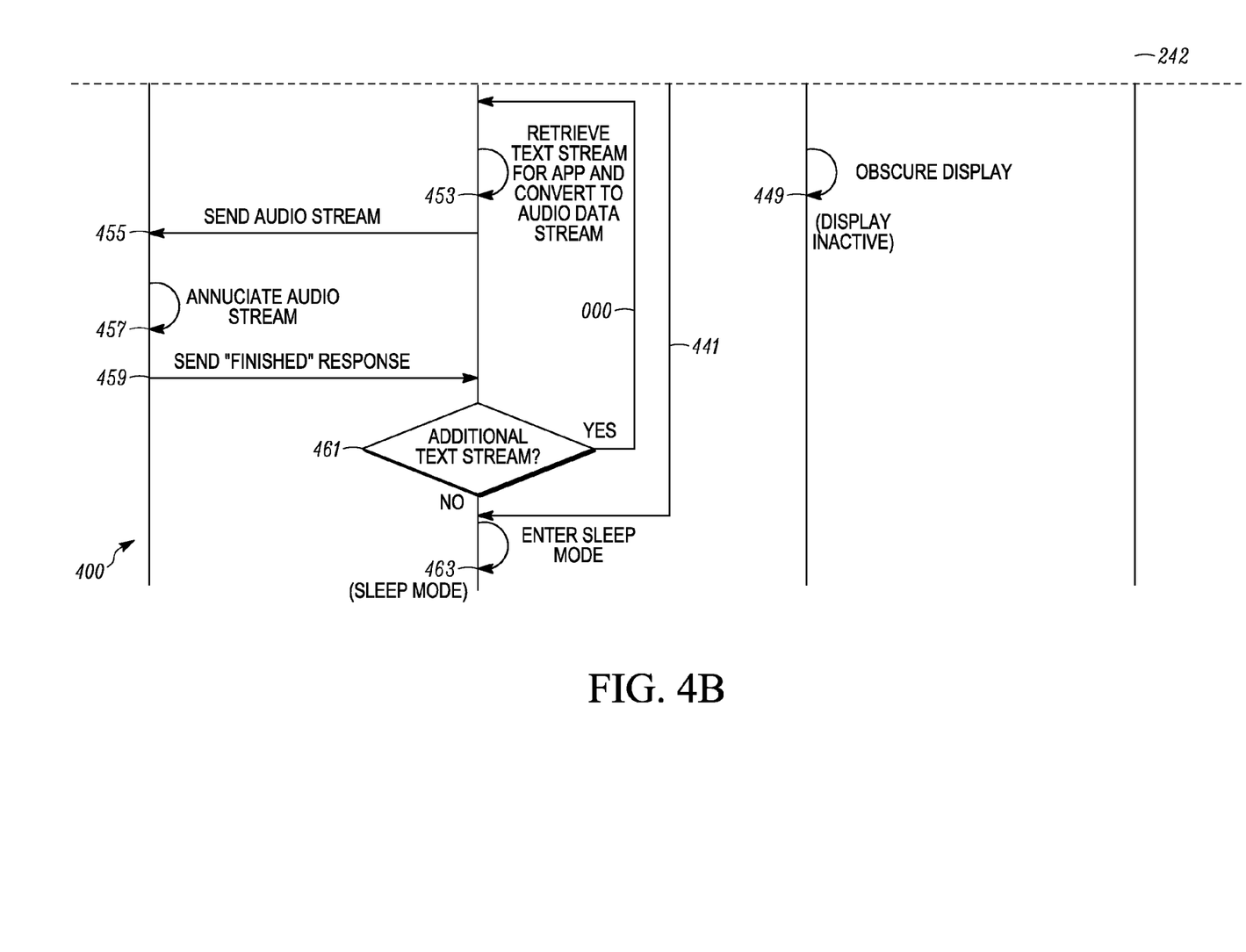

FIG. 4 (FIGS. 4A and 4B) depicts an example signaling diagram 400 associated with managing application notifications and textual data using an electronic device 405 and audio generation module 412 and notification module 413 thereof (such as the electronic device 105 and audio generation module 112 and notification module 113 as discussed with respect to FIG. 1), an audio output device 410 (such as the audio output device 102 as discussed with respect to FIG. 1), and an input device 415 (such as the input device 106 as discussed with respect to FIG. 1). In some embodiments, the input device 415 and the audio output device 410 may be combined into a single device. In other embodiments, the input device 415 and the audio output device 410 may be combined into the electronic device 405.

The functionalities can begin with the display screen of the electronic device 405 activated (425). The input device 415 sends (427) a "notification output" trigger to the audio generation module 412. The notification output trigger can be initiated by a user of the input device 415 via a selection of an input selector (e.g., a key, hardware button, software button, or other selectors). In some cases, the notification output trigger may be an audio command. Although not illustrated in FIG. 4, the audio generation module 412 may process the notification output trigger differently based on the type of trigger, which will be discussed later with respect to FIG. 6.

The audio generation module 412 can request (429) the notification module 413 for an identification of the "foreground" application. For purposes of explanation, the foreground application is the application that is currently displayed on the display screen of the electronic device 405. The foreground application is in contrast to one or more "background" applications that may be executing on the electronic device 405 but are not displayed on the display screen. The notification module 413 can send or provide (431) the identification of the foreground application and a status thereof. For example, the foreground application may be the Gmail® application and the status may indicate two (2) unread emails. Although not illustrated in FIG. 4, the audio generation module 412 may also retrieve, from the notification module 413, notifications associated with one or more background applications if the display screen is not displaying a foreground application. This functionality is discussed later with respect to FIG. 6.

The audio generation module 412 determines (433) if the foreground application has audio user interface support. In particular, the foreground application has audio user interface support if the audio generation module 412 is able to generate speech synthesized audio data corresponding to notifications or other textual data associated with the foreground application. If the foreground application does not have audio user interface support ("NO"), the audio generation module 412 may send (435) a display off command to the notification module 413. Upon receipt of the display off command, the notification module 413 can obscure (437) the display screen. It should be appreciated that obscuring the display screen may include turning off or dimming part or all of the display screen, entering a standby mode, or performing other actions to modify the display screen. The audio generation module 412 can also send (439) a display off announcement to the audio output device 410, and the audio output device 410 can annunciate (445) the display off announcement, for example to inform the user that there is no application audio data to annunciate. Processing may then proceed (441) to 463 (or to other processing) at which the audio generation module 412 can enter a sleep mode.

If the application does have audio user interface support ("YES"), the audio generation module 412 may send (443) a display off command to the notification module 413. Upon receipt of the display off command, the notification module 413 can obscure (449) the display screen according to various techniques as discussed above. The audio generation module 412 can also open (447) a connection with (or can "discover") the audio output device 410, for example via a PAN, WPAN, LAN, WLAN, or other type of connection. The audio generation module 412 can also retrieve (453) a text stream for the application and convert the text stream to an audio data stream (e.g., as speech synthesized audio data). In embodiments, the text stream may be any sort of textual data associated with the application (e.g., the body of an email), any notifications associated with the application (e.g., a sports score), or any combination thereof. Further, in some embodiments, at least some of the retrieved text stream may be displayed on the display screen when the audio generation module 412 receives the notification output trigger. For example, if the display screen displays a series of sports scores when the input device sends the notification output trigger, the retrieved text stream may include the series of displayed sports scores. Although not illustrated in FIG. 4, the audio generation module 412 may interface with the notification module 413 or directly with the application itself to retrieve the text stream for the application.

The audio generation module 412 can send (455) the audio data stream to the audio output device 410 and, upon receipt, the audio output device 410 can annunciate (457) the audio data stream via an external component such as a speaker or other audio output component. When the audio output device 410 completes annunciating the audio data stream, the audio output device 410 can send (459) a "finished" response to the audio generation module 412. Next, the audio generation module 412 can determine (461) if there is an additional text stream. For example, the additional text stream may correspond to additional textual data of the application, an additional notification, or a combination thereof. If there is an additional text stream ("YES"), processing can return to 453 (or to other processing) at which the audio generation module 412 may process the additional text stream and send an additional audio data stream to the audio output device 410 for annunciation. If there is not an additional text stream ("NO"), processing may proceed to 463 (or to other processing) at which the audio generation module 412 can enter a sleep mode.

Figure 5:
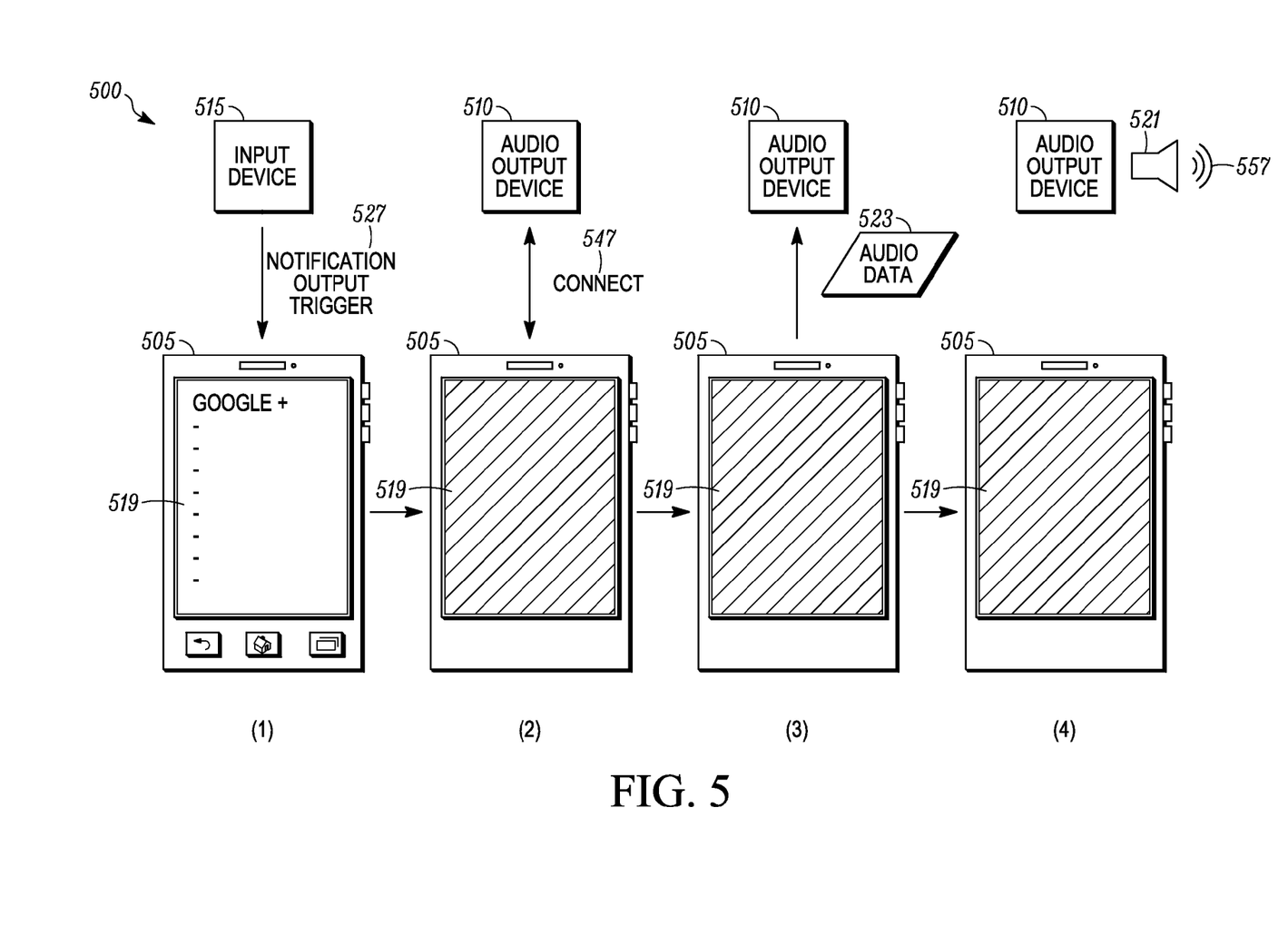
FIG. 5 depicts an example representation of devices configured initiate the communication of notifications and other textual data associated with applications, in accordance with some embodiments.

FIG. 5 depicts an example representation 500 of functionalities and communications associated with managing application notifications and textual data using an electronic device 505, an audio output device 510, and an input device 515.

The first illustration (1) of FIG. 5 depicts the electronic device 505 with a display screen 519 powered on and displaying the Google+™ application. The input device 515 sends the notification output trigger 527 to the electronic device 505 to request audio data for any notifications or textual data associated with the foreground application (i.e., Google+™). The second illustration (2) of FIG. 5 depicts the electronic device 505 responding to the notification output trigger. In particular, the electronic device 505 obscures the display screen 519 and connects 547 to the audio output device 510. Further, the electronic device 505 retrieves a text stream (or any type of textual data or notification) associated with the Google+™ application and converts the text stream to audio data 523. In some embodiments, at least some of the text stream may correspond to textual data that is displayed on the display screen 519 in (1).

The third illustration (3) of FIG. 5 depicts the electronic device 505 sending the audio data 523 (e.g., speech synthesized audio data corresponding to notifications or other types of textual data) to the audio output device 510. The fourth illustration (4) of FIG. 5 depicts the audio output device 510 audibly annunciating 557 the audio data 523 via a component such as a speaker 521. The display screen 519 of the electronic device 505 remains powered off during the audio data annunciating.

Figures 6, 6A:
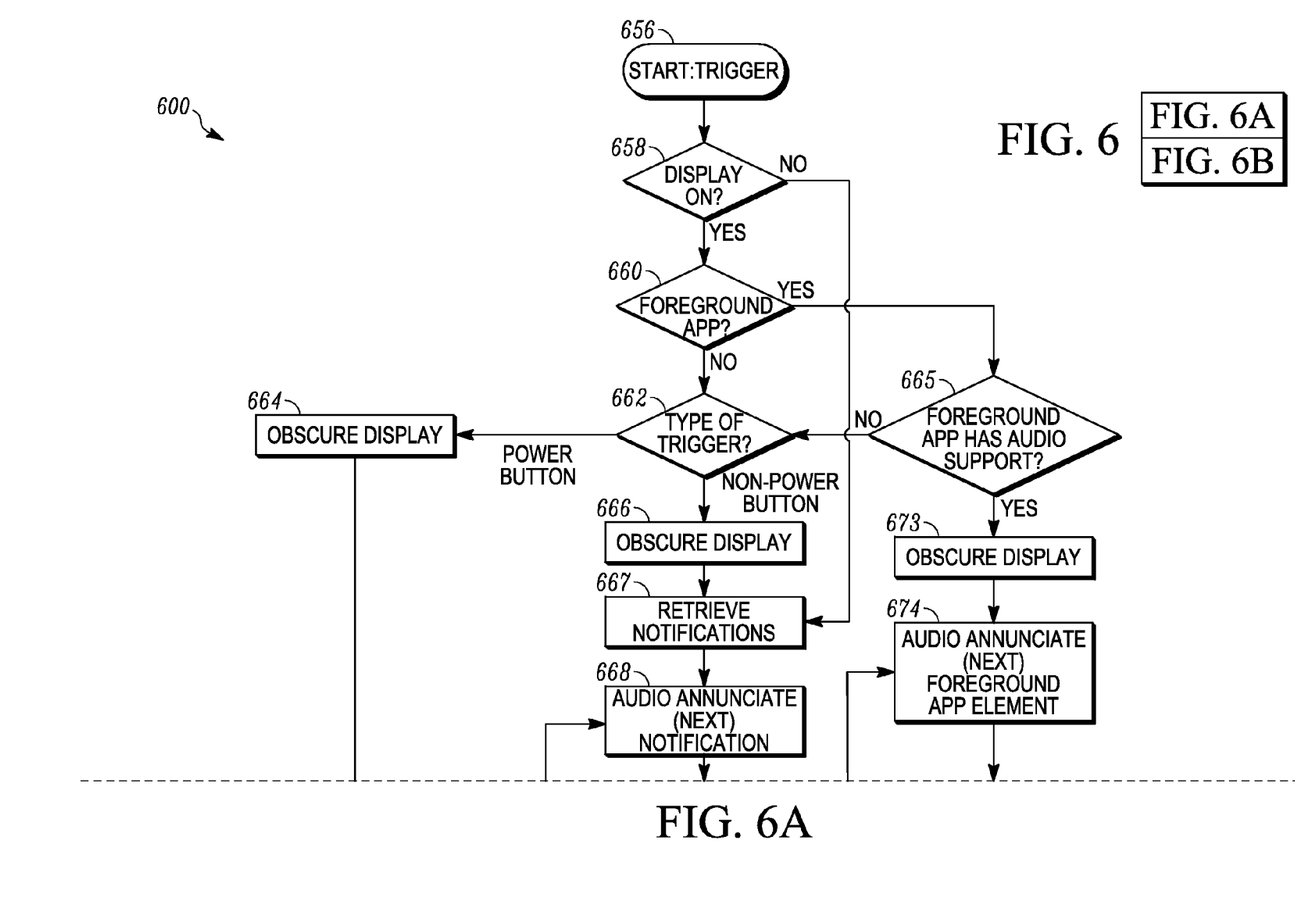
Figure 6B:
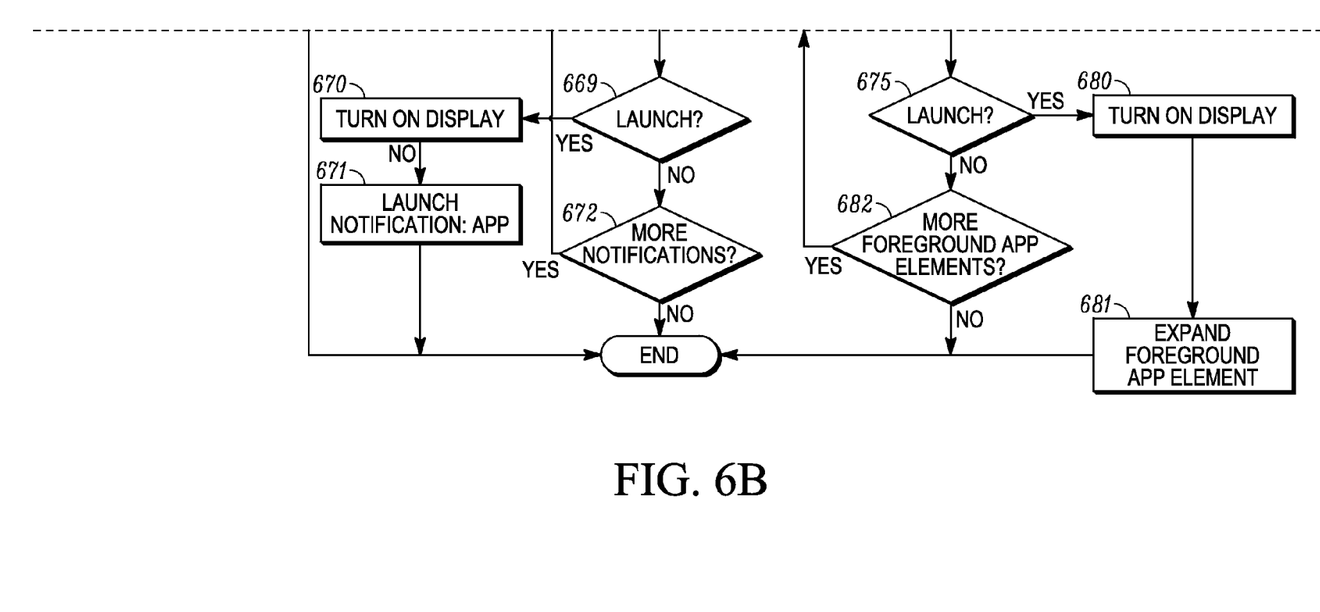

FIG. 6 (FIGS. 6A and 6B) is a flowchart of a method 600 for an electronic device (such as the electronic device 105 as discussed with respect to FIG. 1) to facilitate the annunciation of notifications or textual data associated with one or more applications. The order of the steps of the depicted flowchart of FIG. 6 can differ from the version shown, and certain steps can be eliminated, and/or certain other ones can be added, depending upon the implementation. The method 600 begins with the electronic device receiving or detecting 656 a trigger. The trigger may be a user activation of an input selector of the electronic device itself or of a separate input device.

The electronic device determines 658 whether its display screen is OFF or ON. If the display screen is OFF ("NO"), processing can proceed to 667. If the display screen is ON ("YES"), the electronic device determines 660 whether there is a foreground application. In particular, a foreground application corresponds to an application installed on the electronic device that is currently executing and displaying on the display screen. If there is a foreground application ("YES"), processing can proceed to 665. If there is not a foreground application ("NO"), the electronic device determines 662 the type of the trigger received at 656. In embodiments, the trigger may initiate from a selection of a hardware button (e.g., a power button, a volume up or down button, a home button, etc.), a soft button, or any other type of selector. Generally, if the trigger initiates from a power button and there is no foreground application, the user may desire to simply power off or otherwise obscure the display screen without any audio annunciation. Otherwise, if the trigger initiates from a selection other than the power button, the user may desire to listen to audio notifications or textual data associated with one or more applications.

Accordingly, if the type of trigger is a power button ("POWER BUTTON"), the electronic device obscures the display screen (664), and processing may end or proceed to any other processing. If the type of trigger is not a power button ("NON-POWER BUTTON"), the electronic device obscures 666 the display screen and retrieves 667 one or more notifications associated with the foreground application (if there is a foreground application) and/or any non-foreground applications (i.e., background applications) executing on the electronic device. To retrieve the one or more notifications, the electronic device may directly communicate with the application(s) or indirectly communicate with the application(s) via an operating system-level module, such as a notification module. The electronic device may then communicate with an audio output device and send audio data corresponding to the notification(s) to the audio output device. In some cases, the electronic device itself may include the audio output device (e.g., a speaker component). The audio output device annunciates 668, as audio data, a current notification.

The electronic device then determines 669 if a "display on" request to launch an application has been received. The display on request may correspond to a user activation of an input selector of the electronic device itself or of a separate input device. If the display on request has been received ("YES"), the electronic device turns on 670 or otherwise activates the display screen. Further, the electronic device identifies the application that corresponds to the currently-annunciating or most recently-annunciated notification and launches 671 that application. Processing can then end or proceed to any other functionality. If the display on request has not been received ("NO"), the electronic device determines 672 if there are more notifications to annunciate. If there are more notifications ("YES"), processing can return to 668 at which the electronic device converts an additional notification to audio data and facilitates the audio annunciation of the additional notification. If there are not more notifications ("NO"), processing can end or proceed to any other functionality.

Referring back to 660, if there is a foreground application ("YES"), the electronic device determines 665 whether the foreground application has audio user interface support, for example via the application programming interface (API) of the operating system of the electronic device. If the foreground application does not have audio user interface support ("NO"), processing can proceed to 662 at which the electronic device examines the type of trigger. In contrast, if the foreground application does have audio support ("YES"), the electronic device obscures 673 the display screen. Further, the electronic device identifies any notifications or textual data associated with the foreground application and generates audio data based on the notification(s) or textual data. The electronic device may then communicate with an audio output device and send audio data corresponding to the notification(s) or textual data to the audio output device. In some cases, the electronic device itself may include the audio output device (e.g., a speaker component). The audio output device annunciates 674, as audio data, a current application element (i.e., notification or textual data).

The electronic device then determines 675 if a "display on" request to return to the foreground application display has been received. The display on request may correspond to a user activation of an input selector of the electronic device itself or of a separate input device. If the display on request has been received ("YES"), the electronic device turns on 680 or otherwise activates the display screen. Further, the electronic device expands 681 the corresponding application element for the foreground application. For example, if the foreground application is an email application and the audio output device recites a subject of an email, the electronic device can cause the email application to display that email for review by the user. Processing can then end or proceed to any other functionality. If the display on request has not been received ("NO"), the electronic device determines 682 if there are more foreground application elements to annunciate. If there are more application elements ("YES"), processing can return to 674 at which the electronic device converts an additional application element to audio data and facilitates the audio annunciation of the additional application element. If there are not more application elements ("NO"), processing can end or proceed to any other functionality.

Figure 7:
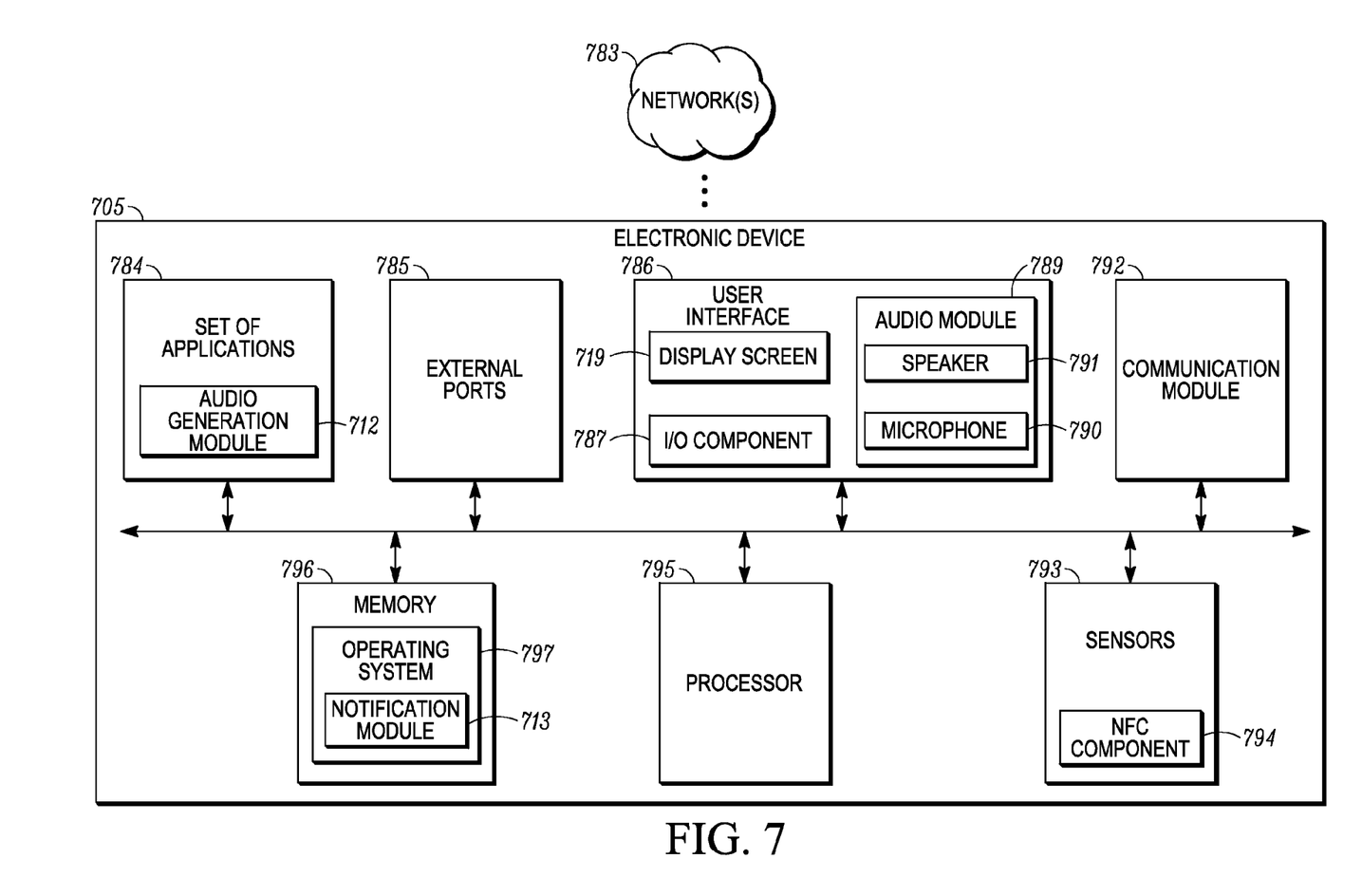
FIG. 7 is a block diagram of an electronic device in accordance with some embodiments.

FIG. 7 illustrates an example electronic device 705 (such as the electronic device 105 as discussed with respect to FIG. 1, or other devices) in which the functionalities as discussed herein may be implemented. The electronic device 705 can include a processor 795 or other similar type of controller module or microcontroller, as well as a memory 796. The memory 796 can store an operating system 797 capable of facilitating the functionalities as discussed herein. The operating system 797 can be configured with (or be configured to interface with) a notification module 713 to facilitate the retrieval of notifications or other textual data from a set of applications 784. The processor 795 can interface with the memory 796 to execute the operating system 797 and the notification module 713 thereof, as well as execute the set of applications 784. The set of applications 784 (which the memory 796 can also store) can include an audio generation module 712 configured to facilitate the speech synthesized audio data generation techniques as discussed herein. The set of applications 784 may also include one or more other installed applications such as, for example, social networking applications, utilities, productivity applications, games, travel applications, communication applications, music and entertainment applications, shopping applications, finance applications, sports applications, photography applications, mapping applications, weather applications, applications for connecting to an online marketplace, and/or other applications. The audio generation module 712 is configured to communicate with both the notification module 713 and any of the set of applications 784. The memory 796 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 can further include a communication module 792 configured to interface with one or more external ports 785 to communicate data via one or more networks 783. For example, the communication module 792 can leverage the external ports 785 to establish a personal area network and secure channels associated therewith for connecting the electronic device 705 to other components such as an audio output device and an input device. According to some embodiments, the communication module 792 can include one or more transceivers functioning in accordance with IEEE standards, 3GPP standards, or other standards, and configured to receive and transmit data via the one or more external ports 785. More particularly, the communication module 792 can include one or more WLAN and/or WPAN transceivers configured to connect the electronic device to local area networks and/or personal area networks. For example, the electronic device 705 can connect to an audio output device via a Bluetooth® network.

The electronic device 705 can further include one or more sensors 793 such as, for example, imaging sensors, accelerometers, touch sensors, and other sensors, as well as NFC components 794 such as an NFC chip and/or an NFC tag for pairing the electronic device 705 with one or more other electronic devices. The electronic device 705 may include a user interface 786 to present information to the user and/or receive inputs from the user. As shown in FIG. 7, the user interface 786 includes a display screen 719 and I/O components 787 (e.g., capacitive or resistive touch sensitive input panels, keys, buttons, lights, LEDs, cursor control devices, haptic devices, and others). In embodiments, the display screen 719 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 786 may further include an audio module 789 including hardware components such as a speaker 791 for annunciating audio data and a microphone 790 for detecting or receiving audio. For example, the microphone 790 can detect audio tones or commands used in a discovery routine. For further example, the speaker 791 can annunciate speech synthesized audio data corresponding to notification(s) of one of the set of applications 784 and generated by the audio generation module 712.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 795 (e.g., working in connection with the operating system 797) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved application notification communication techniques. The embodiments advantageously enable users to easily control the playback of audio notifications without requiring the users to physically interact with user interfaces or requiring the electronic devices to power their display screens. Additionally, the embodiments advantageously enable users to leverage peripheral devices to facilitate the application notification communication.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:
1. A computer-implemented method comprising:
while a display associated with a mobile device is operating in a low-power state:
receiving, the mobile computing device, data indicating a selection of a command for outputting stored audio notifications, in response to receiving the data indicating the selection of the command for communicating stored audio notifications:
selecting, from among a set of one or more stored audio notifications, a particular audio notification, and
providing the particular audio notification for output, and
receiving data indicating a selection of a command for activating the display and invoking an application associated with a currently-output or recently-output audio notification; and
in response to receiving the data indicating the selection of the command for activating the display and invoking an application associated with a currently-output or recently-output audio notification:
identifying a particular application that is associated with the particular audio notification,
activating the display associated with the mobile computing device, and
invoking the particular application.

2. The method of claim 1, wherein providing the particular audio notification for output comprises:
providing, to an audio output device that is separate from the mobile computing device, the particular audio notification for output.

3. The method of claim 1, wherein providing the particular audio notification for output comprises:
generating speech synthesized audio data corresponding to the particular audio notification; and
providing, for output, the speech synthesized audio data.

4. The method of claim 1, wherein the data indicating a selection of a command for activating the display and outputting stored audio notifications is generated in response to receiving a user selection associated with the command.

5. The method of claim 4, wherein the user selection is associated with an audio command.

6. The method of claim 1, comprising:
in further response to receiving the data indicating the selection of the command for communicating the stored audio notifications:
identifying data that corresponds to the particular application and the particular audio notification,
generating speech synthesized audio data corresponding to the data, and
providing, for output, the speech synthesized audio data.

7. The method of claim 1, wherein receiving data indicating a selection of a command for activating the display and invoking an application associated with a currently-output or recently-output audio notification comprises:
receiving, from an audio output device, data to select the currently-output or recently-output audio notification.

8. A system comprising:
one or more computers and one or more storage devices storing instructions that are operable, when executed by the one or more computers, to cause the one or more computers to perform operations comprising:
while a display associated with a mobile device is operating in a low-power state:
receiving, the mobile computing device, data indicating a selection of a command for outputting stored audio notifications,
in response to receiving the data indicating the selection of the command for communicating stored audio notifications:
selecting, from among a set of one or more stored audio notifications, a particular audio notification, and
providing the particular audio notification for output, and
receiving data indicating a selection of a command for activating the display and invoking an application associated with a currently-output or recently-output audio notification; and
in response to receiving the data indicating the selection of the command for activating the display and invoking an application associated with a currently-output or recently-output audio notification:
identifying a particular application that is associated with the particular audio notification,
activating the display associated with the mobile computing device, and
invoking the particular application.

9. The system of claim 8, wherein providing the particular audio notification for output comprises:
providing, to an audio output device that is separate from the mobile computing device, the particular audio notification for output.

10. The system of claim 8, wherein providing the particular audio notification for output comprises:
generating speech synthesized audio data corresponding to the particular audio notification; and
providing, for output, the speech synthesized audio data.

11. The system of claim 8, wherein the data indicating a selection of a command for activating the display and outputting stored audio notifications is generated in response to receiving a user selection associated with the command.

12. The system of claim 11, wherein the user selection is associated with an audio command.

13. The system of claim 8, wherein the operations further comprise:
in further response to receiving the data indicating the selection of the command for communicating the stored audio notifications:
identifying data that corresponds to the particular application and the particular audio notification,
generating speech synthesized audio data corresponding to the data, and
providing, for output, the speech synthesized audio data.

14. The system of claim 8, wherein receiving data indicating a selection of a command for activating the display and invoking an application associated with a currently-output or recently-output audio notification comprises:
receiving, from an audio output device, data to select the currently-output or recently-output audio notification.

15. A non-transitory computer-readable medium storing software comprising instructions executable by one or more computers which, upon such execution, cause the one or more computers to perform operations comprising:
while a display associated with a mobile device is operating in a low-power state:
receiving, the mobile computing device, data indicating a selection of a command for outputting stored audio notifications,
in response to receiving the data indicating the selection of the command for communicating stored audio notifications:
selecting, from among a set of one or more stored audio notifications, a particular audio notification, and
providing the particular audio notification for output, and receiving data indicating a selection of a command for activating the display and invoking an application associated with a currently-output or recently-output audio notification; and in response to receiving the data indicating the selection of the command for activating the display and invoking an application associated with a currently-output or recently-output audio notification:

identifying a particular application that is associated with the particular audio notification, activating the display associated with the mobile computing device, and invoking the particular application.

16. The medium of claim 15, wherein providing the particular audio notification for output comprises:

providing, to an audio output device that is separate from the mobile computing device, the particular audio notification for output.

17. The medium of claim 15, wherein providing the particular audio notification for output comprises:

generating speech synthesized audio data corresponding to the particular audio notification; and providing, for output, the speech synthesized audio data.

18. The medium of claim 15, wherein the data indicating a selection of a command for activating the display and outputting stored audio notifications is generated in response to receiving a user selection associated with the command.

19. The medium of claim 15, wherein the operations further comprise:

in further response to receiving the data indicating the selection of the command for communicating the stored audio notifications:

identifying data that corresponds to the particular application and the particular audio notification, generating speech synthesized audio data corresponding to the data, and providing, for output, the speech synthesized audio data.

20. The medium of claim 15, wherein receiving data indicating a selection of a command for activating the display and invoking an application associated with a currently-output or recently-output audio notification comprises:

receiving, from an audio output device, data to select the currently-output or recently-output audio notification.

\* \* \* \* \*